(12) United States Patent
Fujiwara et al.

(10) Patent No.: US 8,762,105 B2
(45) Date of Patent: Jun. 24, 2014

(54) DEVICE MANAGEMENT METHOD, ANALYSIS SYSTEM USED FOR THE DEVICE MANAGEMENT METHOD, DATA STRUCTURE USED IN MANAGEMENT DATABASE, AND MAINTENANCE INSPECTION SUPPORT APPARATUS USED FOR THE DEVICE MANAGEMENT METHOD

(75) Inventors: Yoshiyasu Fujiwara, Kakogawa (JP); Kazunori Oda, Kakogawa (JP)

(73) Assignee: TLV Co., Ltd., Hyogo (JP)

( * ) Notice: Subject to any disclaimer, the term of this patent is extended or adjusted under 35 U.S.C. 154(b) by 1250 days.

(21) Appl. No.: 11/996,549

(22) PCT Filed: Jul. 25, 2006

(86) PCT No.: PCT/JP2006/314692
§ 371 (c)(1),
(2), (4) Date: Oct. 28, 2008

(87) PCT Pub. No.: WO2007/013468
PCT Pub. Date: Feb. 1, 2007

(65) Prior Publication Data
US 2009/0044042 A1     Feb. 12, 2009

(30) Foreign Application Priority Data

Jul. 25, 2005 (JP) ................. 2005-214646
Jul. 26, 2005 (JP) ................. 2005-216145
Jul. 27, 2005 (JP) ................. 2005-217353

(51) Int. Cl.
*F16T 1/48*         (2006.01)
*G06Q 10/00*     (2012.01)

(52) U.S. Cl.
CPC .. *F16T 1/48* (2013.01); *G06Q 10/20* (2013.01)
USPC .......................................... 702/184; 705/305

(58) Field of Classification Search
CPC .................................. F16T 1/48; G06Q 10/20
USPC .......................................... 702/184; 705/305
See application file for complete search history.

(56) References Cited

U.S. PATENT DOCUMENTS

| | | | | |
|---|---|---|---|---|
| 4,788,849 A * | 12/1988 | Yonemura et al. | ......... | 73/40.5 A |
| 5,856,931 A | 1/1999 | McCasland | | |
| 6,138,109 A * | 10/2000 | Grichnik et al. | ................. | 706/20 |
| 6,332,112 B1 * | 12/2001 | Shukunami et al. | ............ | 702/56 |
| 6,581,045 B1 * | 6/2003 | Watson | ........................ | 705/400 |
| 6,772,093 B2 * | 8/2004 | Nguyen et al. | ................ | 702/182 |

(Continued)

FOREIGN PATENT DOCUMENTS

| | | |
|---|---|---|
| CN | 1629867 | 6/2005 |
| EP | 1 203 910 A2 | 5/2002 |

(Continued)

*Primary Examiner* — John Breene
*Assistant Examiner* — Timothy H Hwang
(74) *Attorney, Agent, or Firm* — The Webb Law Firm

(57) ABSTRACT

Either a complete overhaul for replacing with recommended devices the entire number of devices in a large group of managed devices T, or a partial overhaul for repairing or replacing with recommended devices only those managed devices T that are malfunctioning is selectively performed as an initial overhaul. A complete test involving the entire number of the managed devices T is then periodically performed to determine whether the devices are operating normally or have a malfunction. Any devices found to be malfunctioning during any complete test are repaired or replaced with recommended devices.

3 Claims, 8 Drawing Sheets

(56) References Cited

U.S. PATENT DOCUMENTS

| | | |
|---|---|---|
| 7,130,804 B2 | 10/2006 | Fujiwara |
| 2001/0006384 A1 | 7/2001 | Usaki |
| 2002/0052716 A1* | 5/2002 | Fujiwara ............... 702/184 |
| 2003/0004765 A1* | 1/2003 | Wiegand ................ 705/7 |
| 2005/0004821 A1* | 1/2005 | Garrow et al. ......... 705/7 |
| 2005/0149570 A1 | 7/2005 | Sasaki et al. |
| 2006/0122808 A1* | 6/2006 | Quake et al. ........... 702/183 |

FOREIGN PATENT DOCUMENTS

| | | |
|---|---|---|
| GB | 2 189 321 A | 10/1987 |
| JP | 62246695 | 10/1987 |
| JP | 64-088892 A | 4/1989 |
| JP | 08-263319 A | 10/1996 |
| JP | 2002140745 | 5/2002 |
| JP | 2003-083849 A | 3/2003 |
| JP | 2003296475 | 10/2003 |

* cited by examiner

F I G. 6
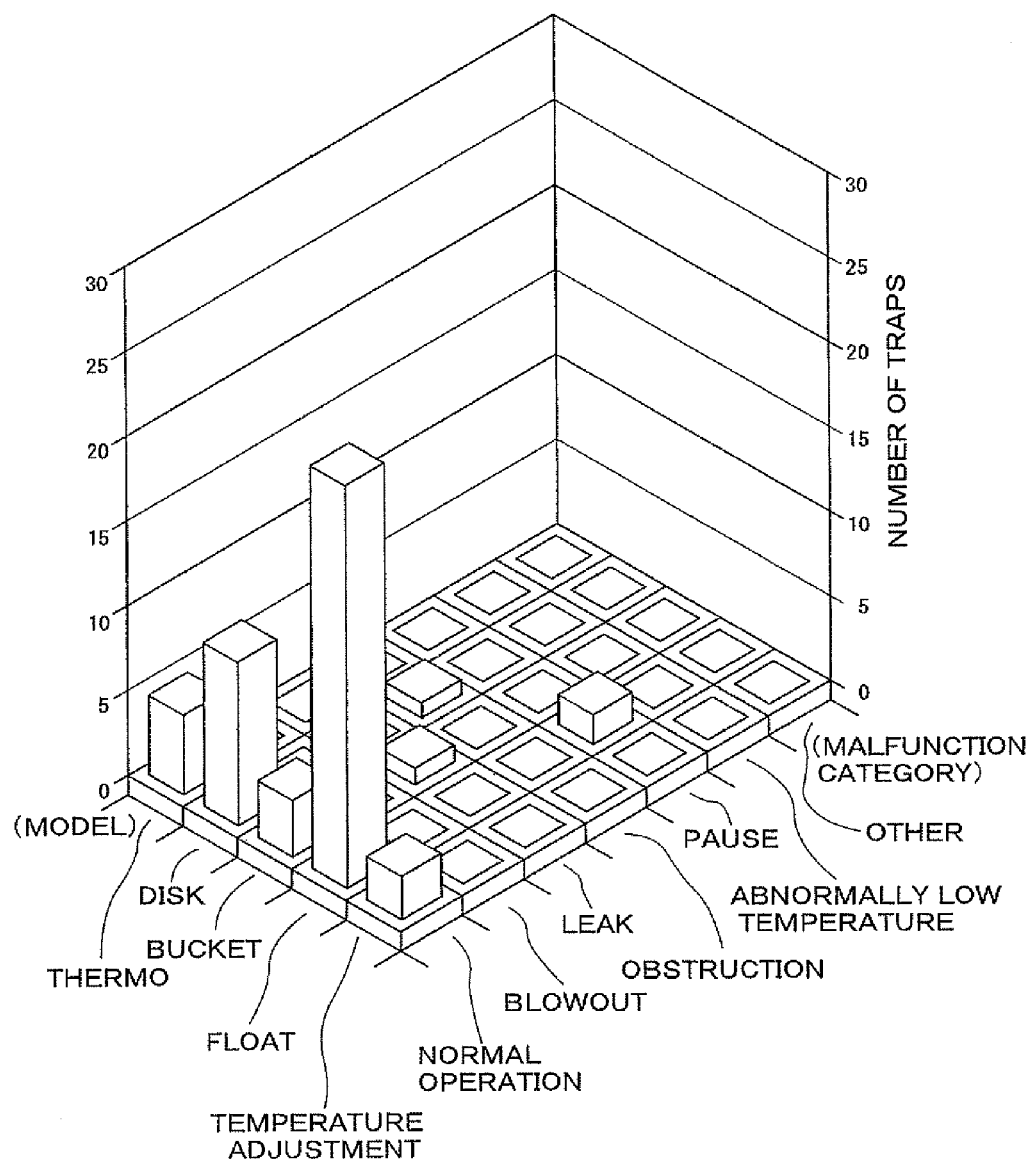

DEVICE MANAGEMENT METHOD, ANALYSIS SYSTEM USED FOR THE DEVICE MANAGEMENT METHOD, DATA STRUCTURE USED IN MANAGEMENT DATABASE, AND MAINTENANCE INSPECTION SUPPORT APPARATUS USED FOR THE DEVICE MANAGEMENT METHOD

TECHNICAL FIELD

The present invention relates to a technique for managing a large group of steam traps, valves, and other devices installed in a plant.

BACKGROUND ART

An example involving steam traps will now be described. To manage a large group of steam traps (referred to hereinbelow merely as "traps") installed in a plant, a method has conventionally been adopted in which, for example, managed trap Nos. 1 to 200 are selected from a group of 1000 managed traps that are assigned control numbers 1 to 1000, and each of the selected traps is tested for malfunctions in a particular year. Managed trap Nos. 201 to 400 are each tested for malfunctions in the next year, and managed trap Nos. 401 to 600 are each tested for malfunctions in the year after that. In other words, a method is adopted in which partial tests are periodically performed to test only some of the managed traps, and the plurality of managed traps subjected to the partial test is sequentially rotated.

When a malfunctioning device is detected in a group of tested traps being handled during each cycle of partial testing, the malfunctioning trap is replaced or repaired. In cases in which a comprehensive trap management log (e.g., a management database) is created so that a test result is recorded for each and every managed trap, the test result for each trap in a group of tested traps being handled during each cycle of partial testing is added to and recorded in the management database.

The present applicant has previously proposed a steam trap management method (see Patent Document 1 below) that is separate from the above-described management method. According to the proposed method, all the managed traps, i.e., both normally functioning traps and malfunctioning traps, are collectively replaced with recommended traps, a new trap management log is created, a complete test is then periodically performed to determine whether any trap in the entire group of managed traps (i.e., collectively replaced traps) is operating normally or has a malfunction, the test result for each of the tested traps handled during each cycle of complete testing is added to and recorded in the trap management log (i.e., the log is updated), and a trap that has been found to be malfunctioning is replaced or repaired.

[Patent Document 1] Japanese Laid-Open Patent Publication No. 2002-140745

DISCLOSURE OF THE INVENTION

Problems that the Invention is Intended to Solve

However, both of the conventional management methods described above are still inadequate as concerns the extent to which the device-management requester (e.g., the owners and operators of the equipment) can be satisfied with the method.

In view of the above-described situation, a principal object of the present invention is to provide a device management technique that can be used to overcome the above-described problems in the degree of satisfaction.

Means for Solving the Problems (1) A first device management method according to the present invention is characterized in comprising: selectively performing as an initial overhaul either a complete overhaul for replacing with recommended devices the entire number of devices in a large group of managed devices, or a partial overhaul for repairing or replacing with recommended devices only those managed devices that are malfunctioning; subsequently periodically performing a complete test involving the entire number of the managed devices to determine whether the devices are operating normally or have a malfunction; and repairing or replacing with recommended devices any devices found to be malfunctioning in each cycle of the complete test.

Specifically, according to this arrangement, the question of whether to perform a complete or partial overhaul as an initial overhaul can be decided according to, e.g., the operational state of the equipment or the respective costs for complete and partial overhauls. An initial overhaul (i.e., the request for device management) is easier for the management requester to perform in this respect.

When a complete overhaul is selected as the initial overhaul, the basic object of device management, which is to maintain the entire number of the managed devices in a functional state to the extent possible, can be effectively achieved in the same manner as the second of the aforedescribed conventional management methods by replacing the entire number of the managed devices with recommended devices in the initial overhaul and then periodically implementing a complete test and repairing or replacing with recommended devices any malfunctioning devices in each cycle of the complete test.

A partial overhaul selected as the initial overhaul is regarded to be somewhat inferior to selecting a complete overhaul, but in comparison with the first of the aforedescribed conventional management methods, a partial overhaul still allows more effective attainment of the basic object of device management, which is to maintain the entire number of the managed devices in a functional state to the extent possible. This object is attained by periodically performing a complete test after the initial overhaul (i.e., performing periodic tests on the entire number of the managed devices, including the devices that were not replaced with recommended devices during the initial overhaul) and repairing or replacing with recommended devices any malfunctioning devices in each cycle of the complete test (i.e., the fraction of recommended devices among the devices at the facility can be increased in a stepwise fashion due to these replacements).

Therefore, according to this arrangement, the degree of satisfaction that can be granted to the management requester can be increased overall relative to the aforedescribed conventional management methods.

The term "periodic complete test" in this instance is not limited to a complete test performed at precise predetermined intervals, but also refers to, a complete test performed, for example, approximately every six months, a complete test performed approximately every year, or to any other complete test that can be regarded as being performed on a roughly regular basis. The same applies hereinbelow.

(2) Another device management method according to the present invention is characterized in comprising: performing an initial overhaul in which a large number of managed devices are tested to determine whether the devices are operating normally or have a malfunction, overhauling of at least part of the normally-operating devices is deferred, the other normally-operating devices are replaced with recommended devices, and malfunctioning devices are repaired or replaced with recommended devices; subsequently periodically performing a complete test on the entire number of the managed devices to determine whether the devices are operating normally or have a malfunction; and repairing or replacing with recommended devices any malfunctioning devices in each cycle of the complete test.

Specifically, according to this arrangement, the initial overhaul is performed in a mode such that the overhauling of at least part of the normally-operating devices among the large number of managed devices is deferred, and only the other devices, including the malfunctioning devices, are repaired or replaced with recommended devices. The expense associated with the initial operation can therefore be reduced, and the initial overhaul (i.e., the request to manage devices) is thereby more easily performed by the management requester in comparison with, for example, performing a complete overhaul in which the entire number of managed devices is replaced with recommended devices during the initial overhaul.

Even though a mode is employed in which the overhauling of at least part of the normally-operating devices is deferred during the initial overhaul, in comparison with the aforedescribed conventional management methods, this method allows more effective attainment of the basic object of device management, which is to maintain the entire number of the managed devices in a functional state to the extent possible. This object is attained by periodically performing a complete test after the initial overhaul (i.e., performing periodic tests on the entire number of the managed devices, including the devices that were not replaced with recommended devices during the initial overhaul) and repairing or replacing with recommended devices any malfunctioning devices in each cycle of the complete test (i.e., the fraction of recommended devices among the devices at the facility can be increased in a stepwise fashion due to these replacements).

The degree of satisfaction that can be granted to the management requester can therefore be increased overall relative to both of the aforedescribed conventional management methods.

(3) Yet another device management method according to the present invention is characterized in comprising: selectively performing as an initial overhaul either a complete overhaul for replacing with recommended devices the entire number of devices in a large group of managed devices, or a partial overhaul for repairing or replacing with recommended devices only those managed devices that are malfunctioning; and creating a management database for cumulatively recording the test result of the complete test performed on the entire number of the managed devices for determining whether the devices are operating normally or have a malfunction.

Specifically, according to this arrangement, the question of whether to perform a complete or partial overhaul as an initial overhaul can be decided according to, e.g., the operational state of the equipment or the respective costs for complete and partial overhauls. An initial overhaul (i.e., the request for device management) is easier for the management requester to perform in this respect.

When either a complete overhaul or a partial overhaul has been selected as the initial overhaul, a management database for cumulatively recording the test results of the complete test performed on the entire number of the managed devices for determining whether the devices are operating normally or have a malfunction is created anew. The entire number of the managed devices can therefore be managed equally (i.e., when a partial overhaul has been selected as the initial overhaul, the entire number of the managed devices can be managed equally, including devices that were not replaced with recommended devices during the initial overhaul) on the basis of the test results of the complete test cumulatively recorded in the new management database.

Therefore, according to this arrangement, the degree of satisfaction that can be granted to the management requester can be increased overall relative to the aforedescribed conventional management methods.

(4) Yet another device management method according to the present invention is characterized in comprising: performing an initial overhaul in which a large number of managed devices are tested to determine whether the devices are operating normally or have a malfunction, overhauling of at least part of the normally-operating devices is deferred, the other normally-operating devices are replaced with recommended devices, and malfunctioning devices are repaired or replaced with recommended devices; and creating a management database for cumulatively recording the test result of the complete test performed on the entire number of the managed devices for determining whether the devices are operating normally or have a malfunction.

Specifically, according to this arrangement, the initial overhaul is performed in a format such that the overhauling of at least part of the normally-operating devices among the large number of managed devices is deferred, and only the other devices, including the malfunctioning devices, are repaired or replaced with recommended devices. The expense associated with the initial operation can therefore be reduced, and the initial overhaul (i.e., the request to manage devices) is thereby more easily performed by the management requester in comparison with, for example, performing a complete overhaul in which the entire number of managed devices is replaced with recommended devices during the initial overhaul.

Even though a format is employed in which the overhauling of at least part of the normally-operating devices is deferred during the initial overhaul, a management database for cumulatively recording the test results of the complete test performed on the entire number of the managed devices for determining whether the devices are operating normally or have a malfunction is created anew. The entire number of the managed devices can therefore be managed equally (i.e., the entire number of the managed devices can be managed equally, including devices that were not replaced with recommended devices during the initial overhaul) on the basis of the test results of the complete test cumulatively recorded in the new management database.

Therefore, the degree of satisfaction that can be granted to the management requester can be increased overall relative to the aforedescribed conventional management methods.

(5) A preferable embodiment of the present invention is characterized in that the complete test is periodically performed after the management database has been created; the test results for each of the complete tests are recorded in the management database; and any malfunctioning devices are repaired or replaced with recommended devices in each cycle of the complete test.

Specifically, according to this arrangement, even when a partial overhaul is selected as the initial overhaul in the implementation of the third characteristic arrangement, and even though a format is employed in the fourth characteristic arrangement in which the overhauling of at least part of the normally-operating devices is deferred during the initial overhaul, this method allows more effective attainment of the basic object of device management, which is to maintain the entire number of the managed devices in a functional state to the extent possible. This object is attained by periodically performing a complete test after the initial overhaul (i.e., performing periodic tests on the entire number of the managed devices, including the devices that were not replaced with recommended devices during the initial overhaul) and repairing or replacing with recommended devices any malfunctioning devices in each cycle of the complete test (i.e., the fraction of recommended devices among the devices at the facility can be increased in a stepwise fashion due to these replacements).

Test results are recorded in the management database for the entire number of the managed devices during each periodic cycle of the complete test. The quality of the service conditions, the causes of malfunctions, and other information can be analyzed for each of the managed devices under the same comparison conditions (i.e., conditions in which the test period, number of tests, test interval, and other test implementation conditions are the same) if the test results of the complete test spanning a plurality of cycles recorded in the management database are analyzed. Correct, highly reliable, and highly useful analysis results can thereby be obtained.

(6) A preferable embodiment of the present invention is characterized in that analysis data is created for indicating a malfunctioning frequency of each of the managed devices on the basis of the test results spanning a plurality of cycles of the complete test.

Specifically, according to this arrangement, analysis data that indicates the malfunctioning frequency (which equals the number of malfunctions per unit time) for each of the managed devices is created on the basis of a plurality of complete test results obtained from periodic complete tests. Analysis data that indicates the malfunctioning frequency for the designated managed device can therefore be obtained for the entire number of the managed devices under the same comparison conditions (i.e., conditions in which the test period, number of tests, test interval, and other test implementation conditions are the same).

Correct and highly reliable analysis results can therefore be obtained if the quality of the service conditions, the causes of malfunctions, and other characteristics of each of the managed devices are analyzed using this analysis data. This method is extremely useful for device management in this respect.

The "managed device malfunctioning frequency" in this instance refers not to the malfunctioning frequency of a single managed device (i.e., the malfunctioning frequency of one device itself) but, strictly speaking, refers to the malfunctioning frequency of the installed devices in one installation site of managed devices. Therefore, in the case in which two malfunctions occur in the managed devices installed in one installation site, and a managed device is replaced for each malfunction, the malfunctioning frequency is calculated to be 1 for each replaced device but is calculated to be 2 for the managed devices installed at that installation site. The same applies hereinbelow.

The analysis data that indicates the malfunctioning frequency or other analysis information for each managed device can be written data printed on paper or the like, electronic data displayed on a computer display, or any other type of data capable of displaying a content.

The display mode for the malfunctioning frequency in the analysis data is not limited to a numerical frequency display, and may also be, e.g., a numerical display of malfunctioning frequency that assumes that the sampling periods for the entire number of the managed devices are identical, or a display mode that visually indicates the frequency and number of occurrences using a graph, chart, drawing, symbol, color, or the like.

(7) Another preferable embodiment of the present invention is characterized in that the managed devices are classified into a plurality of classification categories in accordance with a prescribed classification criterion; and analysis data for indicating a relation between the malfunctioning frequency and a plurality of the classification categories for each of the managed devices, or analysis data for indicating the malfunctioning frequency for each of the managed devices according to the classification category, is created on the basis of the test result of the complete test that spans a plurality of cycles and on the basis of the associated classification category of each of the managed devices.

Specifically, according to this arrangement, analysis data for indicating a relation between a malfunctioning frequency and a plurality of classification categories for each of the managed devices or analysis data for indicating the malfunctioning frequency for each of the managed devices according to the classification category is created on the basis of the test results of the periodic complete tests that span a plurality of cycles and on the basis of the associated classification category of each of the managed devices. Analysis data for indicating a relation between the malfunctioning frequency and a plurality of classification categories for each of the managed devices or analysis data for indicating the malfunctioning frequency for each of the managed devices according to the classification category can therefore be obtained for the entire number of the managed devices under the same comparison conditions (i.e., conditions in which the test period, number of tests, test interval, and other test implementation conditions are the same).

Correct and highly reliable analysis results can therefore be obtained if the quality of the service conditions, the causes of malfunctions, and other characteristics of each of the managed devices are analyzed using this analysis data in the context of the relationships with the plurality of classification categories. This method is extremely useful for device management in this respect.

(8) Another preferable embodiment of the present invention is characterized in that a plurality of prescribed classification criteria are used to classify the managed devices into a plurality of classification categories for each of the classification criteria; and analysis data for indicating a relation between a malfunctioning frequency and the plurality of the classification categories of each of the classification criteria for each of the managed devices or analysis data for indicating the malfunctioning frequency for each of the managed devices according to the classification categories of each of the classification criteria is created on the basis of the test result of the complete test that spans a plurality of cycles and on the basis of the associated classification category of each of the managed devices.

Specifically, according to this arrangement, analysis data for indicating a relation between the malfunctioning frequency and the plurality of the classification categories of each of the classification criteria for each of the managed devices or analysis data for indicating the malfunctioning frequency for each of the managed devices according to the classification categories of each of the classification criteria is created on the basis of the test results of the periodic complete tests that span a plurality of cycles and on the basis of the associated classification category of each of the managed devices. Analysis data for indicating a relation between the malfunctioning frequency and the plurality of the classification categories of each of the classification criteria for each of the managed devices or analysis data for indicating the malfunctioning frequency for each of the managed devices according to the classification categories of each of the classification criteria can therefore be obtained for the entire number of the managed devices under the same comparison conditions (i.e., conditions in which the test period, number of tests, test interval, and other test implementation conditions are the same).

Correct and highly reliable analysis results can therefore be obtained if the quality of the service conditions, the causes of malfunctions, and other characteristics of each of the managed devices are analyzed using this analysis data in the context of the relationships with the plurality of classification categories of each classification criterion. This method is extremely useful for device management in this respect.

(9) Another preferable embodiment of the present invention is characterized in that the replaced or repaired devices are retested during each cycle of the complete test to determine whether the devices are operating normally or have a malfunction, and the repair or replacement is completed for those of the managed devices that have been confirmed by the retesting to operate normally; and for those of the managed devices that have been confirmed by the retesting to have a malfunction, the repair or replacement is repeated until continued retesting confirms that the devices operate normally.

Specifically, according to this arrangement, when a malfunction is confirmed during retesting in each cycle of the complete test, repair or replacement of that device is repeated until retesting confirms that the device is operating normally. Malfunctioning devices that were not successfully replaced, repaired, or otherwise corrected can therefore be prevented from being left in a malfunctioning state and can be reliably put into a normal operating state during each cycle of the complete test (i.e., the entire number of the managed devices can be reliably put into a normal operating state during each cycle of the complete test). The basic object of device management, which is to maintain the entire number of the managed devices in a normal operating state to the extent possible, can thereby be more effectively achieved.

(10) An analysis system for the device management method according to the present invention as described above is also a main subject matter of the present invention. One such analysis system is used in a maintenance inspection operation wherein either a complete overhaul for replacing with recommended devices the entire number of devices in a large group of managed devices, or a partial overhaul for repairing or replacing with recommended devices only those managed devices that are malfunctioning is selectively performed as an initial overhaul, after which a complete test involving the entire number of the managed devices is periodically performed to determine whether the devices are operating normally or have a malfunction, and any devices found to be malfunctioning during any cycle of the complete test are repaired or replaced with recommended devices. The analysis system is characterized in comprising: input means for inputting the test result of the complete test; storage means for cumulatively storing the test result for each cycle of the complete test that is input by the input means; and arithmetic means for creating, in accordance with a preset program, analysis data that indicates a malfunctioning frequency of each of the managed devices on the basis of the test result of the complete test that spans a plurality of cycles, as stored in the storage means.

Specifically, according to this arrangement, a test result for each periodic cycle of complete testing is input by the input means, and the storage means cumulatively stores the test result for each cycle of the complete test thus input. Therefore, the storage means stores the test results for periodic complete tests that span a plurality of cycles.

The arithmetic means creates, in accordance with a preset program, analysis data that indicates the malfunctioning frequency of each of the managed devices on the basis of the test result of the complete test that spans a plurality of cycles, as stored in the storage means. Therefore, creating data in this manner yields analysis data about the malfunctioning frequency of each of the managed devices obtained under the same comparison conditions (i.e., conditions in which the test period, number of tests, test interval, and other test implementation conditions are the same).

Correct and highly reliable analysis results can therefore be obtained if the quality of the service conditions, the causes of malfunctions, and other characteristics of each of the managed devices are analyzed using this analysis data. This analysis system is extremely useful for device management in this respect.

Being able to automatically create such analysis data by an arithmetic means makes it possible to facilitate and streamline the entire analysis operation, including the creation of the analysis data, and hence to facilitate and streamline the entire device management operation.

The display mode for the malfunctioning frequency in the analysis data is not limited to a numerical frequency display, and may also be, e.g., a numerical display of malfunctioning frequency that assumes that the sampling periods for the entire number of the managed devices are identical, or a display mode that visually indicates the frequency and number of occurrences using a graph, chart, drawing, symbol, color, or the like.

(11) Another analysis system is used in a maintenance inspection operation wherein either a complete overhaul for replacing with recommended devices the entire number of devices in a large group of managed devices, or a partial overhaul for repairing or replacing with recommended devices only those managed devices that are malfunctioning is selectively performed as an initial overhaul, after which a complete test involving the entire number of the managed devices is periodically performed to determine whether the devices are operating normally or have a malfunction, and any devices found to be malfunctioning during any cycle of the complete test are repaired or replaced with recommended devices. The analysis system is characterized in comprising: input means for inputting the test result of the complete test and a classification category to which each of the managed devices belongs; storage means for cumulatively storing the test result for each cycle of the complete test that is input by the input means, and storing the associated classification category of each of the managed devices that is input by the input means; and arithmetic means for creating, in accordance with a preset program, analysis data for indicating a relation between a malfunctioning frequency and a plurality of the classification categories for each of the managed devices, or analysis data for indicating the malfunctioning frequency for each of the managed devices according to the classification category, on the basis of the test result of the complete test that spans a plurality of cycles and on the basis of the associated classification category of each of the managed devices, as stored in the storage means.

Specifically, according to this arrangement, a test result for each periodic cycle of complete testing is input by the input means, and the storage means cumulatively stores the test result for each cycle of the complete test thus input. Therefore, the storage means stores the test results for periodic complete tests that span a plurality of cycles, and also stores the associated classification category of each of the managed devices that is input by the input means.

The arithmetic means creates, in accordance with a preset program, analysis data for indicating a relation between the malfunctioning frequency and a plurality of the classification categories for each of the managed devices, or analysis data for indicating the malfunctioning frequency for each of the managed devices according to the classification category, on the basis of the test result of the complete test that spans a plurality of cycles and on the basis of the associated classification category of each of the managed devices, as stored in the storage means. Therefore, creating data in this manner makes it possible to obtain analysis data for indicating a relation between the malfunctioning frequency and a plurality of the classification categories for each of the managed devices, or analysis data for indicating the malfunctioning frequency for each of the managed devices according to the classification category, as obtained under the same comparison conditions (i.e., conditions in which the test period, number of tests, test interval, and other test implementation conditions are the same).

Correct and highly reliable analysis results can therefore be obtained if the quality of the service conditions, the causes of malfunctions, and other characteristics of each of the managed devices are analyzed using this analysis data in the context of the relationships with the plurality of classification categories. This analysis system is extremely useful for device management in this respect.

Being able to automatically create such analysis data by an arithmetic means makes it possible to facilitate and streamline the entire analysis operation, including the creation of the analysis data, and hence to facilitate and streamline the entire device management operation.

(12) Another analysis system is used in a maintenance inspection operation wherein either a complete overhaul for replacing with recommended devices the entire number of devices in a large group of managed devices, or a partial overhaul for repairing or replacing with recommended devices only those managed devices that are malfunctioning is selectively performed as an initial overhaul, after which a complete test involving the entire number of the managed devices is periodically performed to determine whether the devices are operating normally or have a malfunction, and any devices found to be malfunctioning during any cycle of the complete test are repaired or replaced with recommended devices. The analysis system is characterized in comprising: input means for inputting the test result of the complete test and classification categories of each of a plurality of prescribed classification criteria to which each of the managed devices belongs; storage means for cumulatively storing the test result for each cycle of the complete test that is input by the input means, and storing the associated classification categories of each of the plurality of the prescribed classification criteria for each of the managed devices that are input by the input means; and arithmetic means for creating, in accordance with a preset program, analysis data for indicating a relation between a malfunctioning frequency and a plurality of the classification categories of each of the classification criteria for each of the managed devices, or analysis data for indicating the malfunctioning frequency for each of the managed devices according to the classification categories of each of the classification criteria, on the basis of the test result of the complete test that spans a plurality of cycles and on the basis of the associated classification categories of each of the classification criteria for each of the managed devices, as stored in the storage means.

Specifically, according to this arrangement, a test result for each periodic cycle of complete testing is input by the input means, and the storage means cumulatively stores the test result for each cycle of the complete test thus input. Therefore, the storage means stores the test results for periodic complete tests that span a plurality of cycles, and also stores the associated classification categories of each of the classification criteria for each of the managed devices that are input by the input means.

The arithmetic means creates, in accordance with a preset program, analysis data for indicating a relation between the malfunctioning frequency and a plurality of the classification categories of each of the classification criteria for each of the managed devices, or analysis data for indicating the malfunctioning frequency for each of the managed devices according to the classification categories of each of the classification criteria, on the basis of the test result of the complete test that spans a plurality of cycles and on the basis of the associated classification categories of each of the classification criteria for each of the managed devices, as stored in the storage means. Therefore, creating data in this manner makes it possible to obtain analysis data for indicating a relation between the malfunctioning frequency and a plurality of the classification categories of each of the classification criteria for each of the managed devices, or analysis data for indicating the malfunctioning frequency for each of the managed devices according to the classification categories of each of the classification criteria, as obtained under the same comparison conditions (i.e., conditions in which the test period, number of tests, test interval, and other test implementation conditions are the same).

Correct and highly reliable analysis results can therefore be obtained if the quality of the service conditions, the causes of malfunctions, and other characteristics of each of the managed devices are analyzed using this analysis data in the context of the relationships with the plurality of classification categories of each of the classification criteria. This analysis system is extremely useful for device management in this respect.

Being able to automatically create such analysis data by an arithmetic means makes it possible to facilitate and streamline the entire analysis operation, including the creation of the analysis data, and hence to facilitate and streamline the entire device management operation.

The analysis and evaluation information, which is analysis data for indicating a relation between the malfunctioning frequency and a plurality of the classification categories of each of the classification criteria for each of the managed devices or the analysis data for indicating the malfunctioning frequency for each of the managed devices according to the classification categories of each of the classification criteria, can be written data printed on paper or the like, electronic data displayed on a computer display, or any other type of data capable of displaying a content.

The display mode for the relation between the malfunctioning frequency and the classification categories of each of the managed devices in the aforedescribed device management methods and analysis systems is not limited to a display mode that shows the relation by using a graph, chart, or formula, and includes a display mode in which the relation is visually displayed using a drawing, symbol, color, or the like. Similarly, the display mode for the malfunctioning frequency of each managed device classified by classification categories is not limited to a numerical frequency display, and may also be, e.g., a numerical display of malfunctioning frequency that assumes that the sampling periods for the entire number of the managed devices are identical, or a display mode that visually indicates the frequency and number of occurrences using a graph, chart, drawing, symbol, color, or the like.

(13) Another main subject matter of the present invention is a data structure for a management database for assisting in a maintenance inspection operation, in which either a complete overhaul for replacing with recommended devices the entire number of devices in a large group of managed devices, or a partial overhaul for repairing or replacing with recommended devices only those managed devices that are malfunctioning is selectively performed as an initial overhaul, after which a complete test involving the entire number of the managed devices is performed to determine whether the devices are operating normally or have a malfunction. The data structure is characterized in that the test results of the complete test that spans a plurality of cycles are mutually linked and recorded so that the history of each device can be managed; and malfunctioning frequencies for each of the managed devices are obtained based on the test results of the complete tests and recorded.

The malfunctioning frequencies for each of the managed devices obtained based on the test results of the periodic tests spanning a plurality of cycles, i.e., the malfunctioning frequencies for each of the managed devices obtained under the same comparison conditions (i.e., conditions in which the test period, number of tests, test interval, and other test implementation conditions are the same) are displayed based on the analysis data extracted from a database having a data structure that has such characteristics.

Correct and highly reliable analysis results can therefore be obtained if the quality of the service conditions, the causes of malfunctions, and other characteristics of each of the managed devices are analyzed based on the displayed malfunctioning frequencies of each of the managed devices. In this respect, analysis data that is extremely useful for device management will be obtained.

This analysis data can be written data printed on paper or the like, electronic data displayed on a computer display, or any other type of data capable of displaying a content.

The display mode for the malfunctioning frequency in the analysis data is also not limited to a numerical frequency display, and may also be, e.g., a numerical display of malfunctioning frequency that assumes that the sampling periods for the entire number of the managed devices are identical, or a display mode that visually indicates the frequency and number of occurrences using a graph, chart, drawing, symbol, color, or the like.

(14) In a preferred embodiment of the data structure according to the present invention, the managed devices are recorded so as to allow classification into a plurality of classification categories according to a prescribed classification criterion; and the relation between the malfunctioning frequency and the plurality of classification categories of each of the managed devices, or the malfunctioning frequency of each of the managed devices classified by classification categories is obtained based on the test result of the complete test that spans a plurality of cycles and on the basis of the associated classification category of each of the managed devices, and is recorded.

Specifically, according to this arrangement, the relation between the malfunctioning frequency and the plurality of classification categories of each of the managed devices or the malfunctioning frequency of each of the managed devices classified by classification categories obtained on the basis of the test results of the periodic complete tests that span a plurality of cycles and on the basis of the associated classification category of each of the managed devices, i.e. the relation between the malfunctioning frequency and the plurality of classification categories of each of the managed devices or the malfunctioning frequency of each of the managed devices classified by classification categories obtained under the same comparison conditions (i.e., conditions in which the test period, number of tests, test interval, and other test implementation conditions are the same) is displayed using the analysis data.

Correct and highly reliable analysis results can therefore be obtained if the quality of the service conditions, the causes of malfunctions, and other characteristics of each of the managed devices are analyzed based on the displayed relation between the malfunctioning frequency and the plurality of classification categories of each of the managed devices, or the displayed malfunctioning frequency of each of the managed devices classified by classification categories in the context of the relationships with the plurality of classification categories. In this respect, analysis data that is extremely useful for device management will be obtained.

(15) In another preferred embodiment of the data structure according to the present invention, the managed devices are recorded according to a plurality of prescribed classification criteria so as to allow classification into a plurality of classification categories for each of the classification criteria; and the relation between the malfunctioning frequency and the plurality of classification categories of each of the classification criteria for each of the managed devices, or the malfunctioning frequency of each of the managed devices classified by classification categories for each of the classification criteria is obtained on the basis of the test result of the complete test that spans a plurality of cycles and on the basis of the associated classification categories of each of the classification criteria for each of the managed devices, and is recorded.

Specifically, according to this arrangement, the relation between the malfunctioning frequency and the plurality of classification categories of each of the classification criteria for each of the managed devices or the malfunctioning frequency of each of the managed devices classified by classification categories for each of the classification criteria obtained on the basis of the test results of the periodic complete tests that span a plurality of cycles and on the basis of the associated classification category of each of the classification criteria for each of the managed devices, i.e. the relation between the malfunctioning frequency and the plurality of classification categories of each of the classification criteria for each of the managed devices or the malfunctioning frequency of each of the managed devices classified by classification categories for each of the classification criteria obtained under the same comparison conditions (i.e., conditions in which the test period, number of tests, test interval, and other test implementation conditions are the same), is displayed using the analysis data.

Correct and highly reliable analysis results can therefore be obtained if the quality of the service conditions, the causes of malfunctions, and other characteristics of each of the managed devices are analyzed on the basis of the displayed relation between the malfunctioning frequency and the plurality of classification categories of each of the classification criteria for each of the managed devices, or the displayed malfunctioning frequency of each of the managed devices classified by classification categories in the context of the relationships with the plurality of classification categories of each of the classification criteria. In this respect, analysis data that is extremely useful for device management will be obtained.

Yet another main subject matter of the present invention is a maintenance inspection support apparatus for a maintenance inspection of plant facility devices performed on the basis of a guideline selected from a plurality of maintenance inspection guidelines. The maintenance inspection support apparatus according to the present invention comprises: a device layout data management unit for managing layout data of the devices obtained from input device layout plan data; a device attribute value acquisition unit for acquiring a device attribute value of a specified problem device, which acts as a designated device to be subjected to maintenance inspection, using an identification symbol read from an ID tag attached to the problem device while referencing the device layout data that is managed by the device layout data management unit; a device test data acquisition unit for acquiring device test data for the problem device; a device evaluation data generator for combining, for each of the devices, the device attribute value acquired using the device attribute value acquisition unit and the device test data acquired using the device test data acquisition unit, and for generating device evaluation data; a database management unit for appending a history code that allows the device evaluation data to be managed as a history, storing the device evaluation data in a database, and extracting device evaluation data that conforms to a search condition; a classification processor for accessing the database through the database management unit and classifying the device evaluation data while making reference to a classification criteria table; a device analysis processor for making a historical evaluation of device evaluation data extracted from the database or of device evaluation data classified in the classification processor and analyzing an operational state of the devices; a performance computation unit for computing an economic effect of the selected maintenance inspection guidelines on the basis of the analysis results of the device analysis processor; and an assistance information generator for generating assistance information for selecting the maintenance inspection guidelines on the basis of the economic effect computed by the performance computation unit.

A key point of the maintenance inspection support apparatus is that, for the analysis results and the like obtained by the device analysis processor to be used in performing maintenance inspection operation management in a plant facility, the performance computation unit calculates the malfunction rate, total vapor leakage, monetary loss due to vapor leakage, and the like of each device and computes the economic effects of the maintenance inspection operation on the basis of these analysis results or of the device evaluation data obtained from the database via the database management unit. The assistance information generator also has an algorithm for using the analysis results to choose the recommended devices that should be used in a specified location, and can therefore suggest recommended devices to the operator during device replacement at the specified location.

Maintenance inspection guidelines that are used in maintenance inspection operations for supporting the maintenance inspection support apparatus include: a complete overhaul strategy in which a complete overhaul is performed to replace the entire number of devices to be subjected to maintenance inspections with recommended devices, and a complete test involving the entire number of the managed devices is then periodically repeated; and a partial overhaul strategy in which a partial overhaul is performed to repair only those of the devices to be subjected to maintenance inspections that have a malfunction, or to replace the malfunctioning devices with recommended devices, and a complete test involving the entire number of the managed devices is then periodically repeated.

BRIEF DESCRIPTION OF THE DRAWINGS

FIG. 6 is a view showing an analysis graph.

[Key]
T Managed device
Ic Test result
Db Management database
N Malfunctioning frequency
G, E Analysis data
2 Input means
14a, 14b Input means
17 Storage means
Pb Preset program
16 Arithmetic means

BEST MODE FOR CARRYING OUT THE INVENTION

Figure 1:
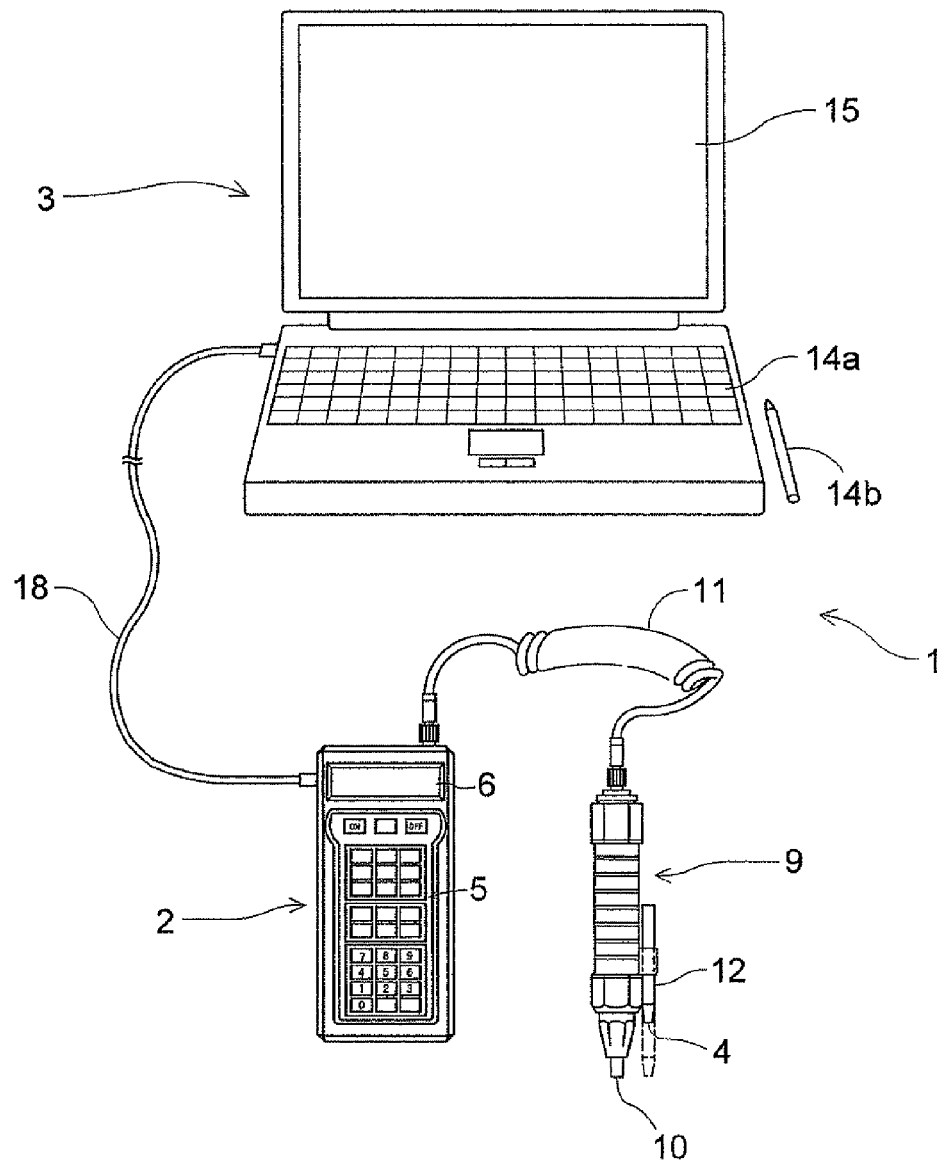
FIG. 1 is a perspective view of a management unit.
Figure 2:
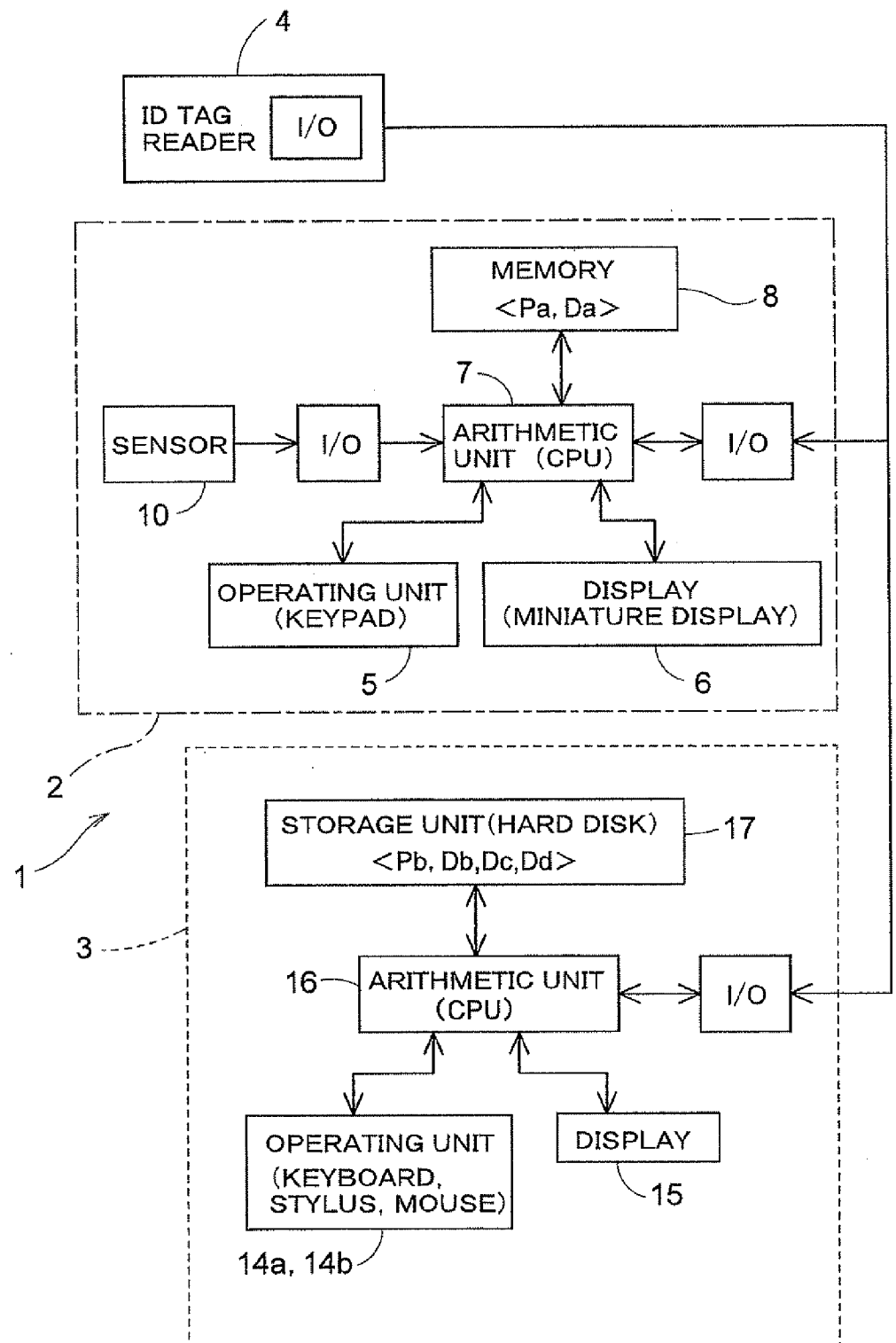
FIG. 2 is a circuit diagram of the management unit.

FIGS. 1 and 2 show a management unit 1 used in the management of a large group of vapor traps T installed in a chemical plant or other vapor-using facility. The management unit 1 is composed of a testing unit 2, a portable personal computer 3 (abbreviated as "portable PC" hereinbelow), and an ID tag reader 4.

The testing unit 2 has a keypad 5 as an operating unit, a miniature display 6 as a display unit, an internal CPU 7 (central processing unit) as an arithmetic unit, and an internal memory 8 as a storage unit. A testing program Pa is stored in the memory 8. The testing unit 2 operates in accordance with the testing program Pa executed by the CPU 7.

Figure 3:
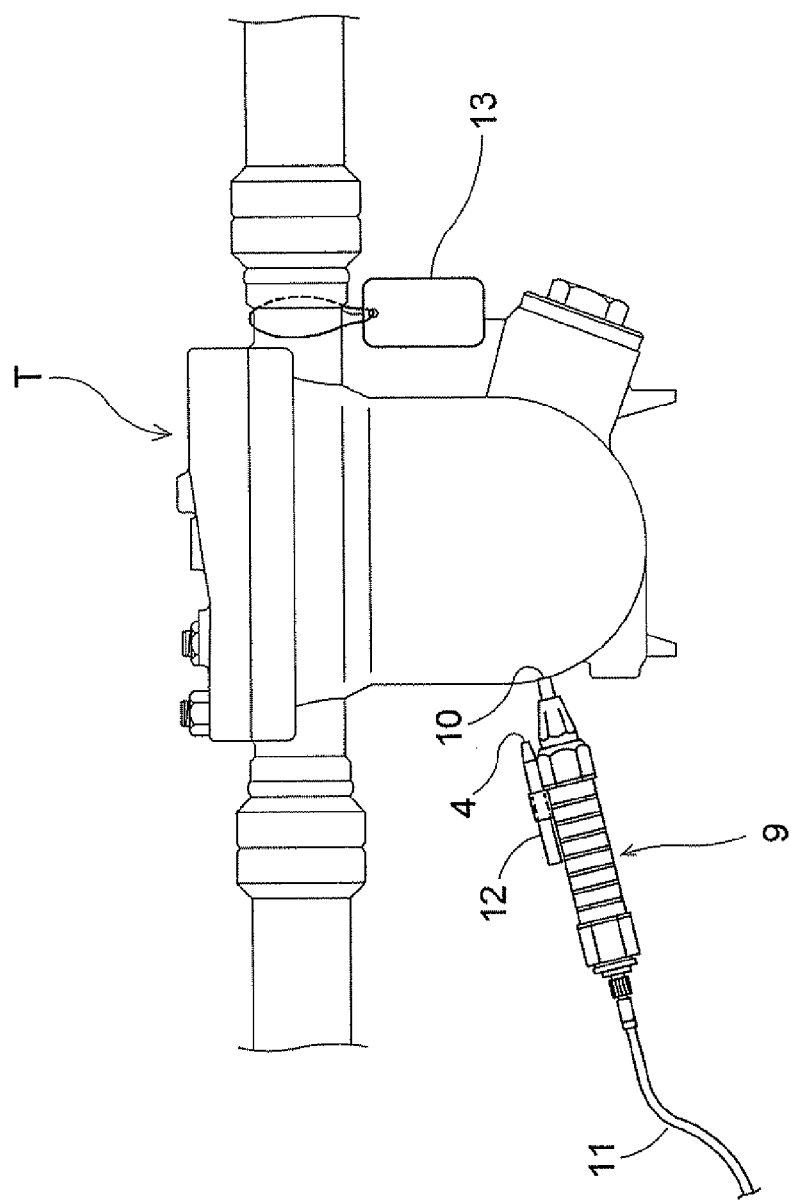
FIG. 3 is a perspective view showing a test mode.

The testing unit 2 has a probe 9. The distal end of the probe 9 is provided with a sensor 10 for detecting the supersonic vibrations and temperature at the external surface of a trap T while pressed against the external surface of the trap, as shown in FIG. 3. Vibration and temperature signals sensed by the sensor 10 are input to the testing unit 2 via a connecting cord 11 (or an infrared communication means or other wireless communication means).

The ID tag reader 4 is provided to the distal end of an arm 12 mounted on the probe 9, with the arm being able to be switched between the extended position shown by the broken line and the retracted position shown by the solid line. When the ID tag reader 4 is brought close to an ID tag 13 attached in the vicinity of each tested trap while the arm 12 is extended, the area number, trap number, and other trap identification information Ia of the corresponding trap T recorded in the ID tag 13 are read by the ID tag reader 4 and are input to the testing unit 2.

The portable PC 3 has a keyboard 14a, stylus 14b, and mouse (not shown) as operating units; a display 15 as a display unit; an internal CPU 16 as an arithmetic unit; and an internal hard disk 17 as a storage unit. A management program Pb is stored on the hard disk 17. The portable PC 3 operates in accordance with the management program Pb executed by the CPU 16.

The portable PC 3 can have two-way communication with the testing unit 2 via a connecting cord 18 (or an infrared communication means or other wireless communication means). The trap identification information Ia that is read by the ID tag reader 4 is input to the testing unit 2 and the portable PC 3.

The memory 8 of the testing unit 2 stores the model, application, service vapor pressure, and other types of trap attribute information Ib of each of the tested traps T. The testing unit 2 reads from the memory 8 the trap attribute information Ib of the tested trap T specified by the trap identification information Ia that was read by the ID tag reader 4. The trap attribute information Ib thus read and the vibrations and temperature sensed by the sensor 10 are evaluated using determination criteria information Da. The determination criteria information Da may, for example, include tables for calculating the vapor leakage rate or the like from the trap model, temperature, and vibration. The determination criteria information Da is stored in the memory 8. Obtaining the vapor leakage rate as a result of the evaluation makes it possible to determine whether the tested trap T is operating normally or has a malfunction. In addition, the malfunction category can also be determined, such as whether the leak is large, medium, or small, whether there is a blowout or an obstruction, or the like.

The testing unit 2 stores the following information in the memory 8: trap reference information Id that may include a test date, notes, and a plurality of other entries that are input by operating the keypad 5 or the like for each of the tested traps T, and the results of determining whether the traps operate normally or have a malfunction, as well as the results of determining the malfunction category as trap test results Ic (trap test information). In the process, the trap test results Ic are correlated with the trap identification information Ia and trap attribute information Ib. These types of information are also transmitted to the portable PC 3.

In the testing unit 2, the trap identification information Ia, trap attribute information Ib, trap test results Ic, and trap reference information Id about the tested traps T specified by the trap identification information Ia that was read by the ID tag reader 4 (or information about the tested traps T specified by operating the keypad 5 or in any other way) are displayed on the miniature display 6 in scrollable form.

The hard disk 17 of the portable PC 3 stores a management database Db in which the trap attribute information Ib about the tested traps T (i.e., managed traps), the trap test results Ic of each of the tests performed by the testing unit 2, the trap reference information Id, and the like are recorded in correlation with the trap identification information Ia. In the portable PC 3 that has received the trap test results Ic from the testing unit 2, a database update function is initiated, and the trap test results Ic and trap reference information Id are cumulatively recorded in the management database Db for the specified tested traps T.

The management database Db may not have any entries of the managed traps T that correspond to the trap identification information Ia read by the ID tag reader 4. When this happens, the portable PC 3 creates a record as a database creation function wherein an entry that is related to the managed traps T (i.e., unrecorded traps) and corresponds to the trap identification information Ia is newly established in the management database Db. The trap test results Ic and trap reference information Id about the managed traps T transmitted from the testing unit 2 are recorded in the management database Db at this point.

Figure 4:
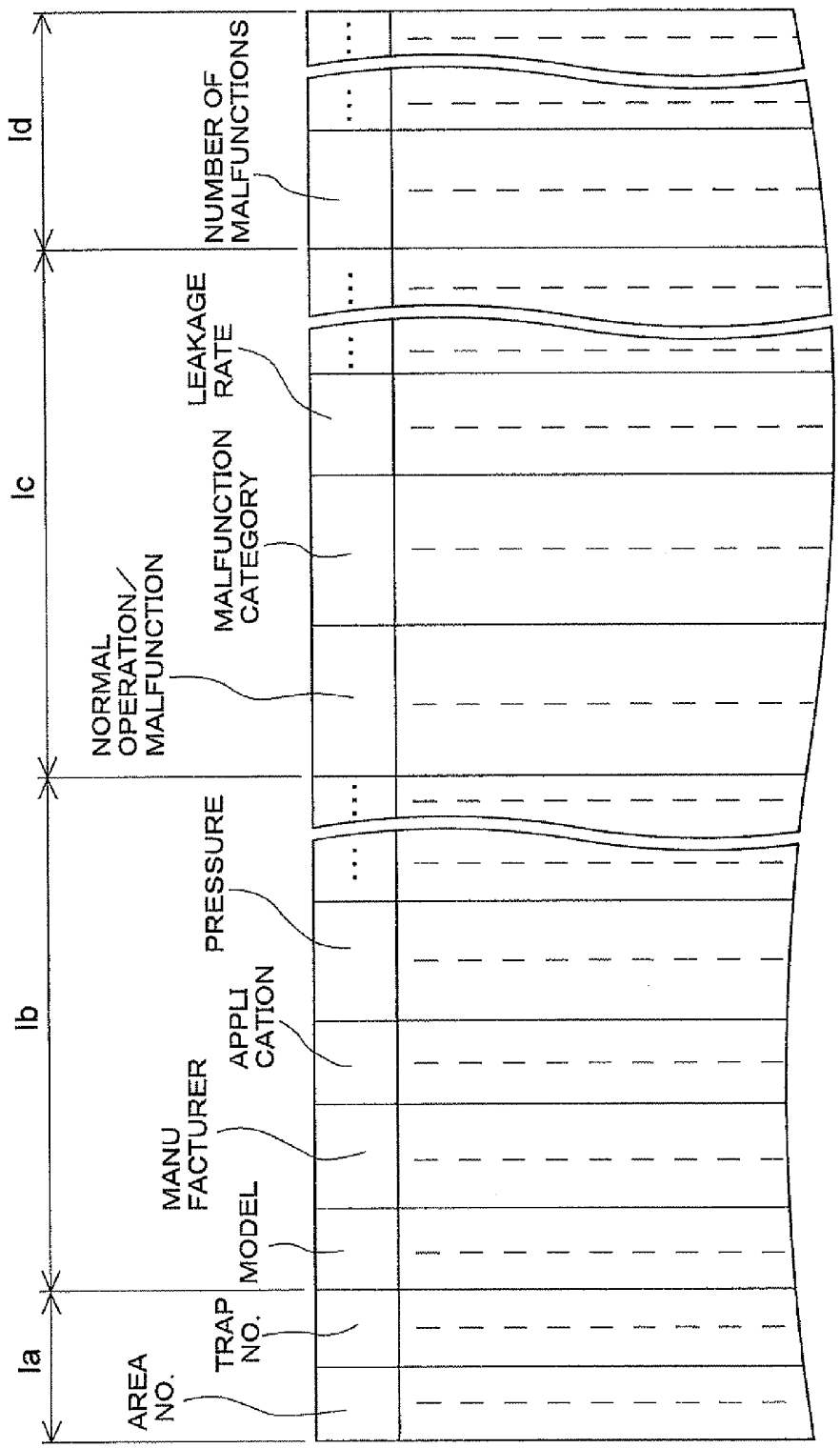
FIG. 4 is view showing the display mode of a management database.

In addition, the portable PC 3 has a database display function whereby the trap identification information Ia, trap attribute information Ib, trap test results Ic, and trap reference information Id about each of the managed traps T recorded in the management database Db are displayed on the display 15 in tabular form, as shown in FIG. 4. In this database display, the table on the display 15 is scrolled so as to display entries related to tested traps T specified by the trap identification information Ia that was read by the ID tag reader 4, or to tested traps T specified by operating the keyboard 14a, stylus 14b, or the like. In cases in which the information Ia to Id about each of the managed traps T has been written or rewritten by operating the keyboard 14a or the like, the content stored in the management database Db is subjected to a write or rewrite operation accordingly.

Figure 5:
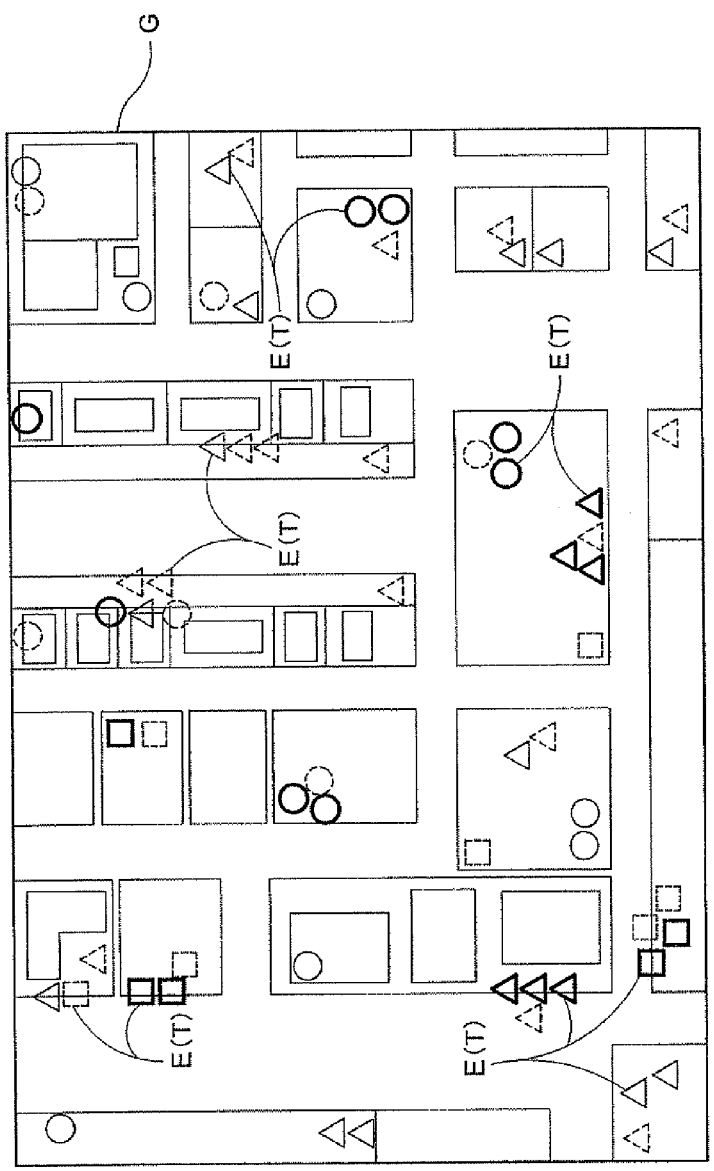
FIG. 5 is a view showing the display mode of a facility chart image.

The portable PC 3 (i.e., the management program Pb) has a mapping function and an analysis data creation function in addition to the database updating and creating function and the database display function described above. With the mapping function, a schematic facility chart image G showing the facility provided with a large group of managed traps T such as the one shown in FIG. 5 is displayed on the display 15 on the basis of facility chart information Dc stored on the hard disk 17. This display is provided instead of the above-described tabular database display shown in FIG. 4. In addition, display elements E (icons) that show individual tested traps T are overlaid on the facility chart image G and displayed on the display 15 in an arrangement that conforms to the actual trap positions. The overlaying is performed on the basis of the trap arrangement information Dd about each of the tested traps T that is stored on the hard disk 17 in the same manner.

When any of the display elements E displayed in the facility chart image G on the display 15 of the portable PC 3 is selected by operating the stylus 14b or the like and is designated for execution, the information Ia to Id about the managed trap T that corresponds to this display element E is read from the management database Db and displayed as a separate frame in the facility chart image G on the display 15.

In addition, as an analysis information creation function of the portable PC 3, the application of the corresponding trap T can be displayed using differences in the shape of the display elements E on the basis of the trap attribute information Ib of each of the managed traps T recorded in the management database Db, as shown in FIG. 5. In this case, a square indicates a general use, a triangle indicates a trace use, and a circle indicates the main pipeline use. Based on the trap test result Ic for each managed trap T cumulatively recorded in the management database Db, and depending on the differences in the border color or pattern of the display elements E, the number N of malfunctions of the corresponding trap T in the most recent preset period (e.g., 3 years) is displayed. In this example, a thin solid border indicates zero times, a thin broken border indicates a single time, and a thick solid border indicates a plurality of times.

As used herein, the term "number N of malfunctions" (i.e., malfunctioning frequency in a preset period) refers to the number of malfunctions experienced by managed traps T installed at a single installation site that accommodates the traps, rather than the number of malfunctions of a single managed trap T (i.e., the malfunctioning frequency of one trap itself) as such.

A single entry or a plurality of entries in any type of information Ia to Id about the managed traps T is similarly displayed as the analysis data creation function in the form of a tabular database display in the portable PC 3, as shown in FIG. 4. In this display, the classification categories (i.e., general use, trace use, main pipeline use, and other classification categories in the "application" entry) of these entries are specified as search conditions by operating the keyboard 14a, the stylus 14b, or the like, whereupon the information Ia to Id recorded in the management database Db is displayed in tabular form on the display 15 only for the managed traps T that belong to these classification categories. For example, specifying "float type" as a search condition for the model entry in the trap attribute information Ib causes the information Ia to Id recorded in the management database Db to be displayed on the display 15 only for float-type managed traps T.

Figure 7:
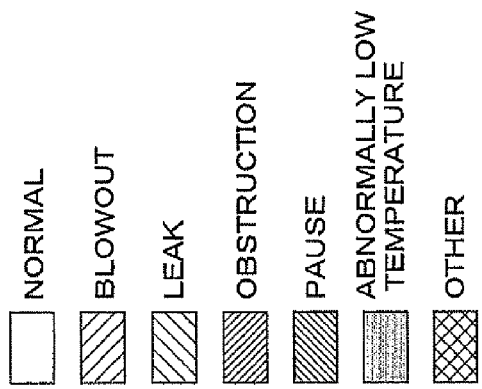
FIG. 7 is a view showing an analysis graph.
Figure 7:
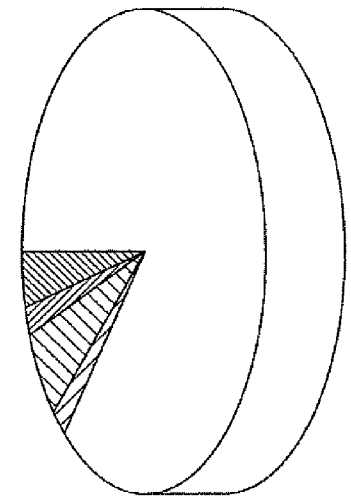
Figure 7:
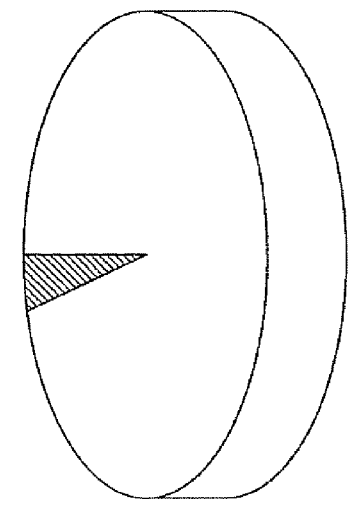

The portable PC 3 further has the following analysis data creation function. When a graphic display is specified in a state in which two entries selected from the information Ia to Id about the managed traps T are indicated by operating the keyboard 14a, stylus 14b, or the like, the number of traps belonging to the classification categories of one of the entries and the number of traps belonging to the classification categories of the other entry (i.e., the number of traps in each classification category for the second entry) are displayed on the display 15 on the basis of the information Ia to Id recorded in the management database Db. The display is in the form of a 3D bar graph, pie graph, or other specified graph. For example, a graph is displayed on the display 15, as shown in FIG. 6, by indicating a model entry in the trap attribute information Ib and indicating entries classified by the malfunction categories in the trap test result Ic for an arbitrary cycle, and specifying a graphic display based on a 3D bar graph. Also, a graph is displayed on the display 15, as shown in FIG. 7, by indicating entries classified by the malfunction categories in the trap test result Ic for a preceding cycle and indicating entries classified by the malfunction categories in the trap test result Ic for the current cycle, and specifying a graphic display based on a pie graph.

A large group of vapor traps T is managed according to the following sequence (a) to (f) using a management unit (portable PC) 1 configured as described above.

(a) It is determined by consultations with the trap management requester which of the vapor traps at a facility are to be designated as managed traps T. Specifically, it is determined based on discussions with the management requester whether all the vapor traps at the facility are to be designated as managed traps T, only the vapor traps in some of the sections at the facility are to be designated as managed traps T, only the vapor traps belonging to a specific vapor system in the facility are to be designated as managed traps T, or the like.

(b) Facility chart information Dc and trap arrangement information Dd, which are stored on the hard disk 17 of the portable PC 3, are created based on a facility arrangement chart, pipeline system chart, or the like presented by the management requester, and the facility chart information Dc and trap arrangement information Dd thus created are stored on the hard disk 17 of the portable PC 3.

(c) As an initial operation, the test operator brings the management unit 1 to the installation site of each of the managed traps T while consulting the facility chart image G displayed on the display 15 of the portable PC 3 and the display elements E on the facility chart image G, attaches an ID tag 13 to each of the managed traps T, and reads the trap identification information Ia by using the ID tag reader 4. Entries related to each of the managed traps T are thereby created by the database creation function in the management database Db of the hard disk 17 in the portable PC 3. In addition, the trap identification information Ia and the display elements E for each of the managed traps T are correlated by the operation of a stylus 14b or the like.

In addition to attaching ID tags 13 and reading the trap identification information Ia, the test operator also confirms the trap attribute information Ib and trap reference information Id for each of the managed traps T, and enters the trap attribute information Ib and trap reference information Id into the management database Db of the portable PC 3 by operating the keyboard 14a, stylus 14b, or the like. The management database Db is thus created anew for all the managed traps T.

Furthermore, the ID tags 13 are attached, the trap identification information Ia is read, and the trap attribute information Ib and trap reference information Id is entered. The test operator thereby enters the trap attribute information Ib and trap reference information Id for each of the managed traps T into the memory 8 of the testing unit 2 from the management database Db of the portable PC 3 for each of the managed traps T. The testing unit 2 is used to test each of the managed traps T, and the test results Ic are stored in the memory 8 of the testing unit 2 and are entered into the management database Db of the portable PC 3.

(d) After the initial operation, the current condition (e.g., malfunction rate, total vapor leakage, monetary loss due to vapor leakage, and the like) of all the managed traps T is reported to the management requester on the basis of the trap test results Ic for the entire number of the managed traps T recorded in the management database Db of the portable PC 3. An initial overhaul is then performed by consultation with the management requester. The overhaul is either a complete overhaul in which the entire number of the managed traps T is replaced with recommended traps (e.g., traps with reduced vapor leakage when operating normally, traps more suitable for the installation conditions or service conditions, or the like), or a partial overhaul in which only malfunctioning managed traps T are repaired or replaced with recommended traps.

As part of the initial overhaul, the replaced or repaired devices are retested using the testing unit 2 to determine whether the devices operate normally or have a malfunction. The repair or replacement is completed for those of the managed traps T that have been confirmed by the retesting to operate normally. For those of the managed traps T that have been confirmed by the retesting to have a malfunction, the repair or replacement is repeated until the retesting confirms that the devices operate normally.

Once a replaced or repaired managed trap T is confirmed by the retesting to operate normally, a replacement or repair record is made for this managed trap T; i.e., the fact of the replacement or repair is recorded in the management database Db of the portable PC 3, as are the post-replacement or post-repair trap attribute information Ib, trap test result Ic, and trap reference information Id.

(e) After the initial overhaul is completed, a complete test is performed periodically, such as annually or semiannually. The testing unit 2 is used to test the entire number of the managed traps T (i.e., to perform a test in which trap identification information Ia is read by the ID tag reader 4 for each trap T, and the probe 9 is brought against the trap T) irrespective of whether a complete or partial overhaul was performed as the initial overhaul. Each time the complete test is performed, trap attribute information Ib about each of the managed traps T is added to the management database Db. If a malfunctioning trap is detected, this trap is repaired or replaced with a recommended trap.

In each cycle of complete testing, a replaced or repaired device is retested by the testing unit 2 to determine whether the device is operating normally or has a malfunction. This retesting is part of the complete test, similarly to an initial overhaul. A managed trap T that has been confirmed by the retesting to operate normally is not replaced, whereas a managed trap T that has been confirmed by the retesting to have a malfunction is repeatedly replaced or repaired until the retesting confirms that the device is operating normally. Once a replaced or repaired managed trap T is confirmed by the retesting to operate normally, a replacement or repair record is made for this managed trap T; i.e., the fact of the replacement or repair is added to the management database Db of the portable PC 3, as are the post-replacement or post-repair trap attribute information Ib, trap test result Ic, and trap reference information Id.

In each cycle of complete testing, another testing mode can be adopted instead of the testing mode in which the management unit 1 composed of a testing unit 2, portable PC 3, and ID tag reader 4 is used by the test operator as a portable unit to test each managed trap T in the same manner as during the previous cycle of initial overhauling accompanied by the creation of a management database Db. Specifically, it is also possible to adopt a testing mode in which only the testing unit 2 provided with an ID tag reader 4 is used by the test operator as a portable unit to test each managed trap T, and the trap test result Ic and trap reference information Id about each of the managed traps T recorded in the memory 8 of the testing unit 2 is collectively entered into the management database Db of the portable PC 3 after the test.

(f) The service conditions, causes of malfunctions, and other information about the managed traps T are analyzed after each cycle of complete testing or in another suitable period using an analysis data creation function of the portable PC 3 such as the one described above. Examples of the analysis data creation function include functions such as displaying the type of application based on the shape of a display element E, displaying the number N of malfunctions by the type of border on a display element E, displaying recorded information Ia to Id only for managed traps T of a specific classification category, or displaying a graph. The analysis results are reported to the management requester, and appropriate measures are taken in the facility on the basis of those analysis results.

Figure 8:
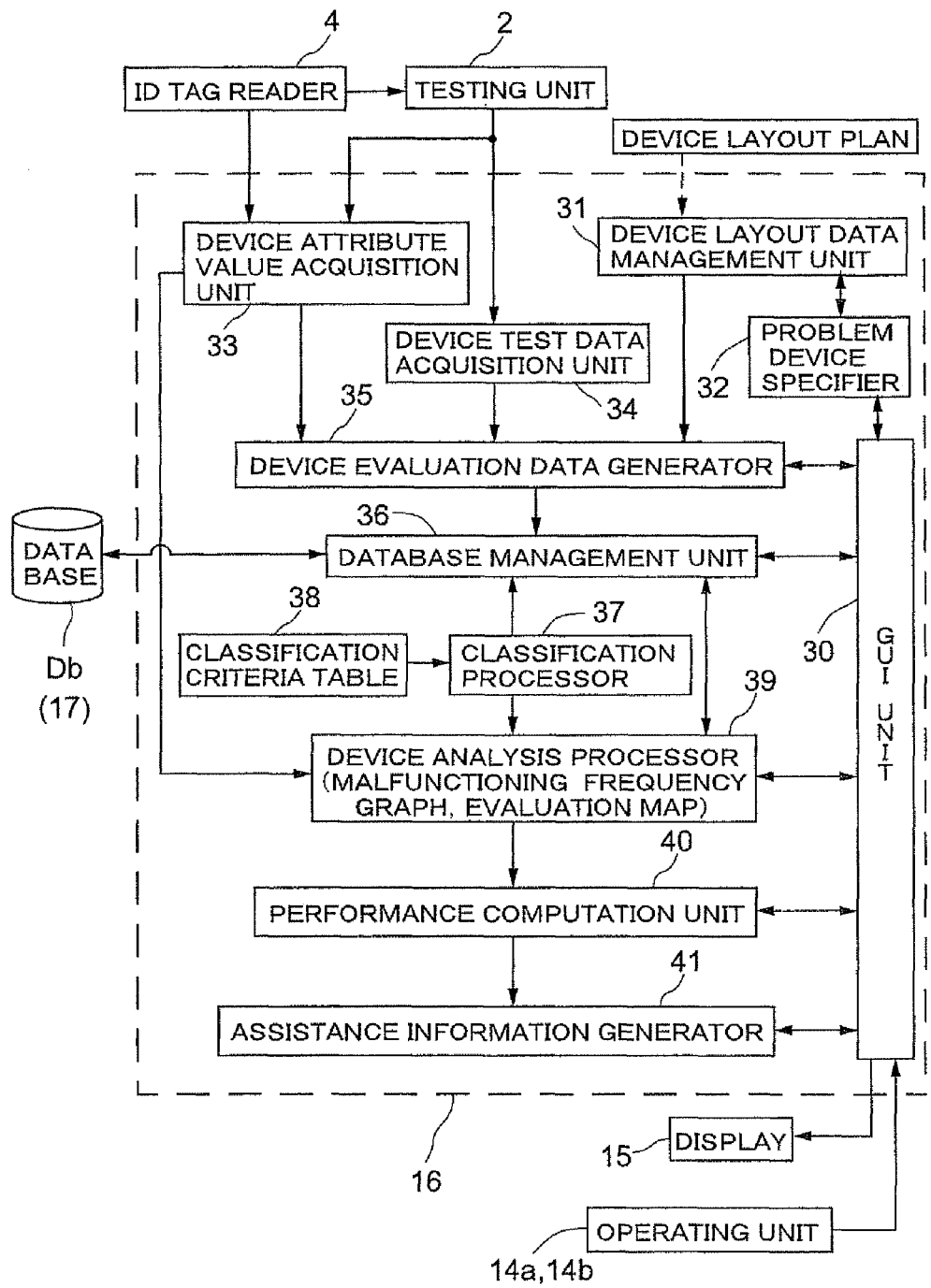
FIG. 8 is a functional block view of a portable PC.

In performing maintenance inspections on traps T and other plant facility devices (the term "trap T" has been used here in relation to such devices, but the word "device," which is a general term, will be adopted hereinbelow) at a plant facility, the above-described portable PC 3 uses a signal from the ID tag reader 4 or testing unit 2, and provides efficient assistance to the maintenance inspection operation for the plant facility devices. In particular, the computer provides efficient assistance to the operator during the performance of a maintenance inspection of the plant facility devices in compliance with the maintenance inspection guidelines. Maintenance inspection guidelines include a complete overhaul strategy in which a complete overhaul is performed to replace the entire number of devices to be subjected to maintenance inspections with recommended devices, and a complete test involving the entire number of the managed devices is then periodically repeated; and a partial overhaul strategy in which a partial overhaul is performed to repair only those of the devices to be subjected to maintenance inspections that have a malfunction, or to replace the malfunctioning devices with recommended devices, and a complete test involving the entire number of the managed devices is then periodically repeated. For this reason, the functions of the portable PC 3 are configured using programs and hardware such as those shown in FIG. 8.

Graphic user interfaces are extensively used in the portable PC 3 in order to transmit information to the operator in an easily understandable manner by presenting a graphic display via the display 15, and to allow comments to be entered by the simple operation of the operating units 14a, 14b via a graphic screen. The unit that implements such a graphic user interface is a GUI unit 30. This unit operates in close coordination with the OS installed on the portable PC 3, and is linked with a functional unit involved in the maintenance inspection operation assistance provided by the portable PC 3 and described below.

A device layout data management unit 31 performs a management task wherein device layout data is loaded from the outside. In the device layout data, device positions are linked to map data related to the plant site on the basis of device layout plan data digitized so as to indicate the layout of devices scheduled for maintenance inspections. When each device is subjected to a maintenance inspection, an assistance screen such as the one shown in FIG. 5 is displayed on the display 15 on the basis of the device layout data managed by the device layout data management unit 31, and the operator is notified of problem devices, which are devices that need to undergo a maintenance inspection next. Problem devices specified by the operator are confirmed by a problem device specifier 32. An identification symbol (trap identification information Ia) that is read by the ID tag reader 4 from an ID tag 13 attached to a problem device can be used as a key code for a device attribute value (trap attribute information Ib) stored in the memory 8 of the testing unit 2 in the above-described embodiment. Therefore, a device attribute value of the device specified by the identification symbol can be acquired by the portable PC 3. A device attribute value acquisition unit 33 is provided in order to acquire the device attribute value of the device specified via the ID tag 13 in this manner. The device specified by the ID tag 13, i.e., the problem device, is tested by the testing unit 2, whereby a test signal (trap test result Ic) sent from the testing unit 2 is processed by a device test data acquisition unit 34 as device test data that shows whether each device is operating normally or has a malfunction.

The device attribute values acquired by the device attribute value acquisition unit 33 and the device test data acquired by the device test data acquisition unit 34 are sent to a device evaluation data generator 35, and are combined there in a mode in which the corresponding devices are linked to specific identification symbols to form device evaluation data. The device evaluation data thus generated for each of the problem devices is stored in a database Db. The device evaluation data for each device is stored in the database Db each time a periodic maintenance inspection operation is performed, and this device evaluation data is treated as history information about each of the devices. For this reason, a database management unit 36 is provided for recording the device evaluation data in the database Db after a history code (date or the like) is added so that the history [of each device] can be managed, and extracting device evaluation data that matches search conditions in which history conditions are also included. Since the devices recorded in the database Db are sorted into a large group of classification categories in accordance with the specifications of these devices, a classification that corresponds to these classification categories is needed when the device evaluation data is analyzed and on other occasions. A function is therefore provided wherein the device evaluation data is classified while a classification processor 37 accesses the database Db and references a classification criteria table 38 via the database management unit 36.

A device analysis processor 39 for analyzing the operational state of each device on the basis of the history of device evaluation data has an algorithm for performing a statistical analysis in terms of malfunctioning frequency as described above, and also has a visualizing algorithm for visually representing the analysis results in the form of a graph, map, or other format. Since the malfunctioning frequency is significantly affected by the location or the conditions of use, the device evaluation data serving as the analysis source is used in accordance with the analysis target either in the form of data directly extracted from the database Db or in the form of data classified by the classification processor 37.

For the analysis results and the like obtained by the device analysis processor 39 to be used in performing maintenance inspections in a plant facility, a performance computation unit 40 calculates the malfunction rate, total vapor leakage, monetary loss due to vapor leakage, and the like of each device and computes the economic effects of the maintenance inspection operation on the basis of the analysis results and of device evaluation data obtained from the database Db via the database management unit 36.

The following types of maintenance inspection guidelines have been offered for use in the maintenance inspection of plant facility devices: a complete overhaul strategy in which a complete overhaul is performed to replace the entire number of devices to be subjected to maintenance inspections with recommended devices, and a complete test involving the entire number of the managed devices is then periodically repeated; and a partial overhaul strategy in which a partial overhaul is performed to repair only those of the devices to be subjected to maintenance inspections that have a malfunction, or to replace the malfunctioning devices with recommended devices, and a complete test involving the entire number of the managed devices is then periodically repeated. Selection of either the two strategies as appropriate varies with each plant facility. Therefore, the problem of which of the strategies to select in accordance with the plant facility scheduled for a maintenance inspection can be resolved by evaluating past performance. Therefore, the assistance information generator 41 is provided with an algorithm for generating assistance information (economic effects of each strategy at a variety of plant facilities, and the like) whereby either of the above-described two strategies is selected as a maintenance inspection guideline on the basis of economic effects evaluated by the performance computation unit 40. The algorithm for generating such assistance information can be constructed in a simple manner by adopting a decision theory system such as a neural network or an expert system.

Other Embodiments

Other embodiments of the present invention are described next.

Vapor traps are given as examples of managed devices in the above-described embodiment, but the managed devices used in the implementation of the present invention are not limited to vapor traps alone, and may also include various valves or tanks, as well as production equipment and machine tools.

The above embodiment was described with reference to a device management method wherein either a complete overhaul for replacing with recommended devices (recommended traps) the entire number of devices in a large group of managed devices (managed traps), or a partial overhaul for repairing or replacing with recommended devices (recommended traps) only those managed devices (managed traps) that are malfunctioning (malfunctioning traps), was selectively performed as an initial overhaul. It is also possible, however, to instead adopt a device management technique wherein an initial overhaul is performed in which the overhauling of at least part of the normally-operating devices among the large number of managed devices is deferred, and the other devices, including the malfunctioning devices, are repaired or replaced with recommended devices. A management database is created at the same time as the initial overhaul in order to cumulatively record the test result of the complete test performed on the entire number of the managed devices for determining whether the devices are operating normally or have a malfunction, or, after the initial overhaul, a complete test is periodically performed on the entire number of the managed devices to determine whether the devices are operating normally or have a malfunction, and any malfunctioning devices are repaired or replaced with recommended devices in each cycle of the complete test.

The above embodiment was described with reference to a device management method wherein the managed devices (managed traps) were classified into a plurality of classification categories (e.g. general use, trace use, main pipeline use) in accordance with a prescribed classification criterion (e.g., application), and analysis data for indicating a relation between the malfunctioning frequency and a plurality of the classification categories for each of the managed devices and for indicating the malfunctioning frequency for each of the managed devices according to the classification category was created on the basis of the test result of the complete test that spans a plurality of cycles and on the basis of the associated classification category of each of the managed devices. It is also possible, however, to instead adopt a device management technique wherein a plurality of prescribed classification criteria are used to classify the managed devices into a plurality of classification categories (e.g. general use, trace use, main pipeline use or other classification categories, and float, bucket, disk, or other classification categories) for each of the classification criteria (e.g., application and model), and analysis data for indicating a relation between the malfunctioning frequency and a plurality of the classification categories of each of the classification criteria for each of the managed devices, or analysis data for indicating the malfunctioning frequency for each of the managed devices according to the classification categories of each of the classification criteria is created on the basis of the test result of the complete test that spans a plurality of cycles and on the basis of the associated classification categories of each of the classification criteria for each of the managed devices.

The above embodiment was described with reference to an analysis system provided with arithmetic means in which analysis data that shows the malfunctioning frequency of each of the managed devices, the malfunctioning frequency of each of the managed devices classified by the classification categories, and the relation between these malfunctioning frequencies and a plurality of the classification categories is created in accordance with a preset program on the basis of a test result of a complete test that spans a plurality of cycles and on the basis of the associated classification category of each of the managed devices, as stored in the storage means. It is also possible, however, to instead adopt an analysis system that has input means for inputting the test result of the complete test and classification categories of each of a plurality of prescribed classification criteria to which each of the managed devices belongs; storage means for cumulatively storing the test result for each cycle of the complete test that is input by the input means, and storing the associated classification categories of each of the classification criteria for each of the managed devices that are input by the input means; and arithmetic means for creating, in accordance with a preset program, analysis data for indicating a relation between the malfunctioning frequency and a plurality of the classification categories of each of the classification criteria for each of the managed devices, or analysis data for indicating the malfunctioning frequency for each of the managed devices according to the classification categories of each of the classification criteria, on the basis of the test result of the complete test that spans a plurality of cycles and on the basis of the associated classification categories of each of the classification criteria for each of the managed devices, as stored in the storage means.

INDUSTRIAL APPLICABILITY

The present invention can be applied to the management or support of maintenance inspection operations involving a large group of devices typified by vapor traps, valves, and other devices installed in a plant.

The invention claimed is:

1. A maintenance inspection support apparatus for a maintenance inspection of plant facility devices performed on the basis of a guideline selected from a plurality of maintenance inspection guidelines, the maintenance inspection support apparatus comprising:
    a device layout data management unit for managing layout data of the devices obtained from input device layout plan data;
    a device attribute value acquisition unit for acquiring a device attribute value of a specified problem device, which acts as a designated device to be subjected to maintenance inspection, using an identification symbol read from an ID tag attached to the problem device while referencing the device layout data that is managed by the device layout data management unit;
    a device test data acquisition unit for acquiring device test data for the problem device;
    a device evaluation data generator for combining, for each of the devices, the device attribute value acquired using the device attribute value acquisition unit and the device test data acquired using the device test data acquisition unit, and for generating device evaluation data;
    a database management unit for appending a history code that allows the device evaluation data to be managed as a history, storing the device evaluation data in a database, and extracting device evaluation data that conforms to a search condition;
    a classification processor for accessing the database through the database management unit and classifying the device evaluation data while making reference to a classification criteria table;
    a device analysis processor for making a historical evaluation of device evaluation data extracted from the database or of device evaluation data classified in the classification processor, and analyzing an operational state of the devices;
    a performance computation unit for computing an economic effect of the selected maintenance inspection guidelines on the basis of the analysis results of the device analysis processor; and
    an assistance information generator for generating assistance information for selecting the maintenance inspection guidelines, the assistance information being generated on the basis of the economic effect computed by the performance computation unit, wherein the assistance information is generated with an algorithm that is constructed through the adoption of a decision theory system comprising a neural network,
    wherein the maintenance inspection guidelines include:
    a complete overhaul strategy in which a complete overhaul is performed to replace the entire number of devices to be subjected to maintenance inspections with recommended devices, and a complete test involving the entire number of the managed devices is then periodically repeated; and
    a partial overhaul strategy in which a partial overhaul is performed to repair only those of the devices to be subjected to maintenance inspections that have a malfunction, or to replace the malfunctioning devices with recommended devices, and a complete test involving the entire number of the managed devices is then periodically repeated.

2. The maintenance inspection support apparatus according to claim 1, wherein the assistance information generator has an algorithm for using the analysis results of the device analysis processor to choose recommended devices to be used in a specified location, and suggests the recommended devices during device replacement at the specified location.

3. A maintenance inspection support apparatus for a maintenance inspection of plant facility devices performed on the basis of a guideline selected from a plurality of maintenance inspection guidelines, the maintenance inspection support apparatus comprising:
    a device layout data management unit for managing layout data of the devices obtained from input device layout plan data;
    a device attribute value acquisition unit for acquiring a device attribute value of a specified problem device, which acts as a designated device to be subjected to maintenance inspection using an identification symbol read from an ID tag attached to the problem device while referencing the device layout data that is managed by the device layout data management unit;
    a device test data acquisition unit for acquiring device test data for the problem device;
    a device evaluation data generator for combining, for each of the devices, the device attribute value acquired using the device attribute value acquisition unit and the device test data acquired using the device test data acquisition unit, and for generating device evaluation data;
    a database management unit for appending a history code that allows the device evaluation data to be managed as a history, storing the device evaluation data in a database, and extracting device evaluation data that conforms to a search condition;
    a classification processor for accessing the database through the database management unit and classifying the device evaluation data while making reference to a classification criteria table;
    a device analysis processor for making a historical evaluation of device evaluation data extracted from the database or of device evaluation data classified in the classification processor, and analyzing an operational state of the devices;
    a performance computation unit for computing an economic effect of the selected maintenance inspection guidelines on the basis of the analysis results of the device analysis processor; and
    an assistance information generator for generating assistance information for selecting the maintenance inspection guidelines, the assistance information being generated on the basis of the economic effect computed by the performance computation unit, wherein the assistance information is generated with an algorithm that is constructed through the adoption of a decision theory system comprising a neural network,
    wherein the assistance information generator has an algorithm for using the analysis results of the device analysis processor to choose recommended devices to be used in a specified location, and suggests the recommended devices during device replacement at the specified location.

* * * * *